(12) United States Patent  
Singer

(10) Patent No.: US 8,057,632 B2
(45) Date of Patent: Nov. 15, 2011

(54) SIMULATED BRUSH STROKE SYSTEM

(75) Inventor: Karl Singer, Barrington Hills, IL (US)

(73) Assignee: D&K Group, Inc., Elk Grove Village, IL (US)

(*) Notice: Subject to any disclaimer, the term of this patent is extended or adjusted under 35 U.S.C. 154(b) by 85 days.

(21) Appl. No.: 12/436,628

(22) Filed: May 6, 2009

(65) Prior Publication Data

US 2009/0277580 A1 Nov. 12, 2009

Related U.S. Application Data

(60) Provisional application No. 61/050,686, filed on May 6, 2008.

(51) Int. Cl.
*B32B 37/00* (2006.01)

(52) U.S. Cl. .......................... 156/325; 156/60

(58) Field of Classification Search .................. 156/325, 156/60
See application file for complete search history.

(56) References Cited

U.S. PATENT DOCUMENTS

| 5,721,041 A * | 2/1998 | Baratto ..................... 428/195.1 |
| 2002/0119287 A1* | 8/2002 | Redlin ......................... 428/141 |

OTHER PUBLICATIONS

Letter dated Dec. 21, 2009 from M. Oosterhuis of Drytac Corporation addressed to K. Singer of D&K; cc: to T. Fahey of Ungaretti & Harris LLP.

* cited by examiner

*Primary Examiner* — Katarzyna Wyrozebski Lee
*Assistant Examiner* — Daniel Lee
(74) *Attorney, Agent, or Firm* — Ungaretti & Harris LLP

(57) ABSTRACT

A laminated assembly (10) comprising a substrate (100) with an image (103) thereon, has a first film (20) with a brush stroke texture embossed therein (21), a second film (40) with a canvas texture embossed therein (41) to create a final product having the appearance of a piece of fine art.

12 Claims, 9 Drawing Sheets

SIMULATED BRUSH STROKE SYSTEM

CROSS-REFERENCE TO RELATED APPLICATIONS

This application claims the benefit of U.S. Provisional Application No. 61/050,686, filed on May 6, 2008, which is hereby incorporated by reference as if fully set forth herein.

FEDERALLY SPONSORED RESEARCH OR DEVELOPMENT

N/A

TECHNICAL FIELD

The present invention generally relates to art work, and more particularly, to a product and method for creating a piece of art, such as a picture, that looks like it has been painted by a paint brush by using and creating a one- or two-sided lamination.

BACKGROUND OF THE INVENTION

To make a print appear as an original piece of artwork, an image is often printed directly on a treated canvas-type substrate with the outer surface being coated with a preservative, such as a lacquer or polyurethane. The resultant print is then stretched and secured to a frame. The end product has the appearance as though the image has been directly painted on the canvas. However, this just described method often results in a flat surface lacking the depth, dimension, and brush patterns of a true painted image.

In the alternative, the substrate holding the image is embossed with a pattern or texture resembling a canvas material. If the image is generated on the embossed substrate, the image can lose clarity and show flaws. In addition, the embossing process, whether performed before or after the image is placed on the substrate can damage the print. The above processes do not always work and can result in wasted materials and products with poor quality.

The present invention addresses some of these shortcomings as well as others. It permits the printing of an image on a substrate, such as paper. The print is then laminated on one or both sides to enhance the print and not diminish it.

The end product simulates an actual brush stroke and adds value to the printed image by enhancing the original image, by adding a protective layer over the image, and by bringing depth and dimension to a flat, exposed print surface. The resulting product also reduces the likelihood of damage and/or degradation possible with prints when left unfinished. Thus, the resultant product adds aesthetic value to a printed image while simultaneously increasing the longevity and intrinsic value of the print itself.

SUMMARY OF THE INVENTION

The front or viewing side of a print is laminated to a first overlaminate. The overlaminate has embossed thereon or therein a brush stroke pattern and is preferably laminated by the thermal lamination process. The embossed brush stroke texture has angularly related brush strokes (FIGS. 10A-10D). The backside of the print may also be laminated to a second overlaminate. This overlaminate has embossed thereon or therein a canvas-like pattern and is also preferably laminated by the thermal lamination process. As a result, the print is sandwiched or disposed between two embossed laminates giving the print an appearance of being painted on the face side and being made of canvas on the backside.

The print can further include marginal edges around the print left blank or colored separately. The marginal edges can be secured to a supporting frame member (hollow in the center) by conventional means so as to give the final appearance of a customized or individualized work of art. The finished product can then be displayed or put within an outer frame. The resulting product is a print that looks like an original and unique piece of art.

Other features and advantages of the invention will be apparent from the following specification taken in conjunction with the following drawings.

BRIEF DESCRIPTION OF THE DRAWINGS

In the accompanying drawings forming part of the specification, and in which like numerals are employed to designate like parts throughout the same.

DETAILED DESCRIPTION

Figure 1:
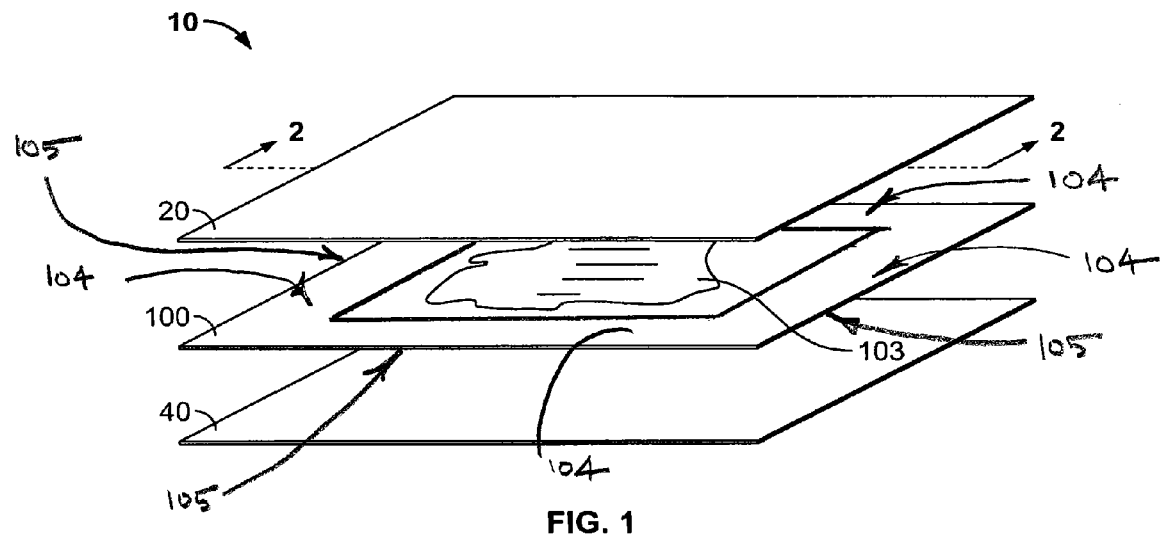
FIG. 1 is an exploded perspective illustration of the laminated product, or assembly, of the present invention.
Figure 2:
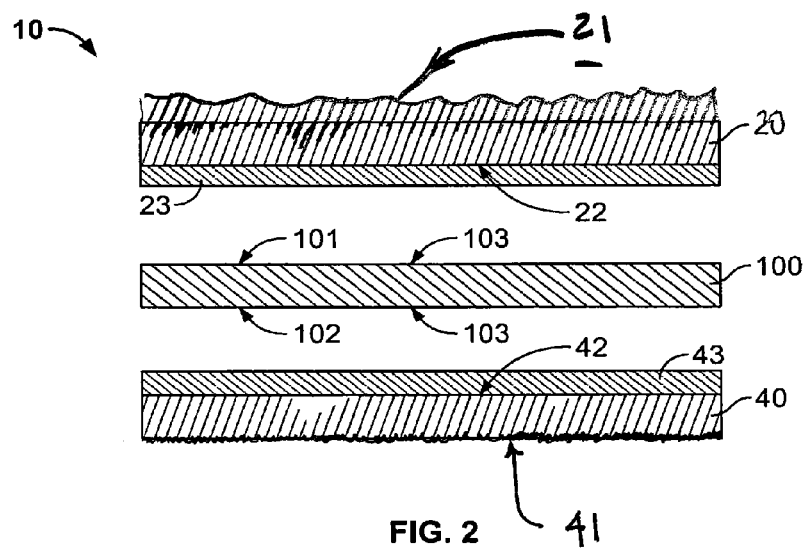
FIG. 2 is a cross-sectional view of the assembly along line 2-2 in FIG. 1.
Figure 3:
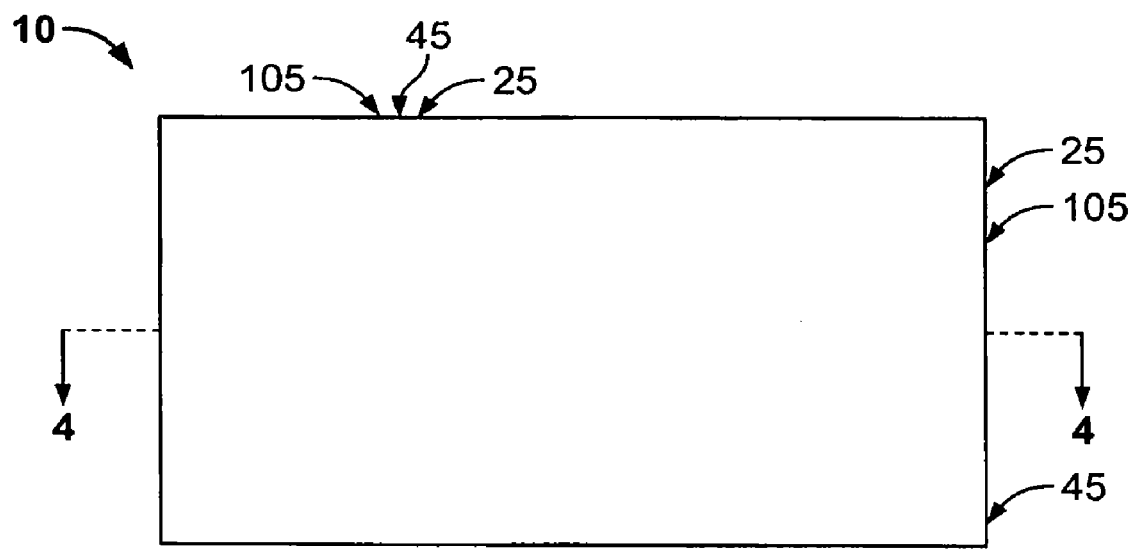
FIG. 3 is a top plan view of a first embodiment of the assembly of FIG. 1 as assembled.
Figure 4:
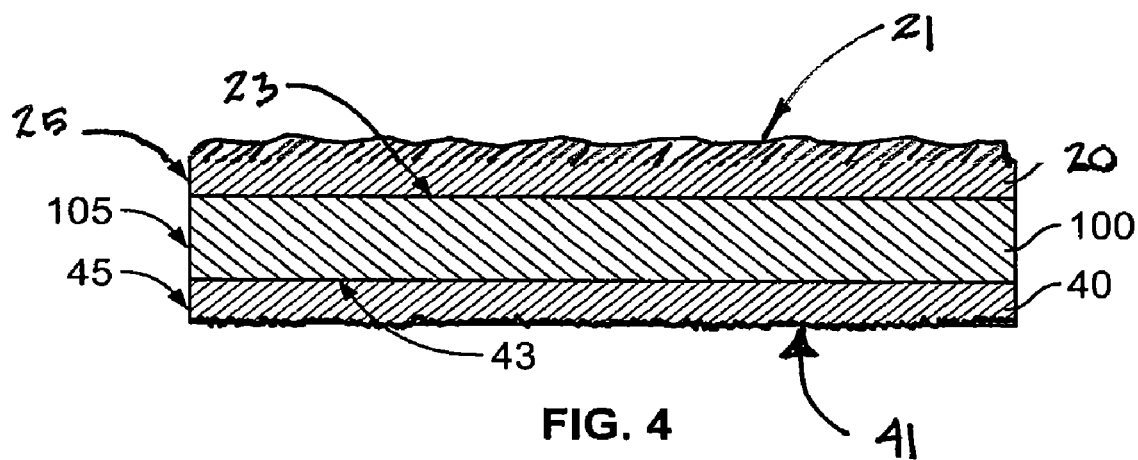
FIG. 4 is a cross-sectional view of the assembly along line 4-4 in FIG. 3.

While this invention is susceptible of embodiments in many different forms, there is shown in the drawings and will herein be described in detail preferred embodiments of the invention with the understanding the present disclosure is to be considered as an exemplification of the principles of the invention and is not intended to limit the broad aspect of the invention to the embodiments illustrated.

Turning to FIG. 1, an assembly or laminate 10 made according to the teachings of the present invention is shown. In the preferred embodiment, a substrate 100 is disposed between two laminates 20,40, sometimes called overlaminates.

The substrate 100 has a first opposed outer surface 101 and second opposed outer surface 102. The first outer, front or face surface 101 has an image 103 thereon. The image is preferably a work of art, such as picture or print. A marginal edge 104 may, if desired, be left blank between the outermost edges 105 of the substrate and the image 103. The substrate 100 is typically paper, preferably heavy stock paper.

A first film 20 overlays one of the outer surfaces 101 of the substrate 100. This first film 20 has an outer surface 21 and an inner surface 22. An adhesive 23 is applied to the inner surface 22 of the film 20. The inner surface 22 is the surface facing one of the outer surfaces 101 of the substrate 100 when laminating the assembly 10 together. The outer surface 21 is the surface facing away from the substrate 100 towards the environs.

A second film 40 overlays the other outer surface 102 of the substrate 100. This second film 40 has an outer surface 41 and an inner surface 42. An adhesive 43 is also applied to the inner surface 42 of the film 40. The inner surface 42 is the surface facing one of the outer surfaces 102 of the substrate 100 when laminating the assembly 10 together. The outer surface 41 is the surface facing away from the substrate 100 towards the environs.

The laminating film 20,40 used for the laminate 10 is preferably a thermal laminating film, one made of a thermoplastic polymer. Thermoplastic polymers, including polyester (PET), polypropylene (OPP), nylon (NYL), vinyl and the like, are suitable in a thermal lamination.

The adhesives used on these films incorporate vinyl acetate into the backbone of the polyethylene polymer. The resulting resin is an EVA (Polyethylene Vinyl Acetate copolymer) or form thereof. These adhesives are not tacky at room temperature, but become tacky when heat is applied to them, e.g., over 175° F. Because the adhesive 23,43 for the films 20,40 is thermally activated, when heat and pressure are applied to the film, such as by a thermal lamination machine, the adhesive is activated. The preferable adhesive used for the assembly 10 is SUPERSTICK® adhesive, manufactured and sold by D&K International, Inc., 1795 Commerce Drive, Elk Grove Village, Ill. 60007 USA. The adhesive is dry to the touch and relies on heat to activate. The activation temperature is approximately 160°-200° F. When the adhesive is heated, it softens, or melts. Under pressure and heat, it marries substrates together. When cooled, the adhesive solidifies and provides an extremely strong chemical bond between the married substrates. It has been found that SUPERSTICK® adhesive adheres to and enhances the substrates 20,40 of the present invention.

With respect to the first film 20, it has been found that a vinyl overlaminate works best. In particular, 11 mil vinyl having 2 mil of adhesive works the best. Tests show that films thinner than 11 mil do not typically work well because they do not have enough depth to allow for the proper embossing of brush strokes. The depth permits the simulated brush strokes embossed on the outer surface of the overlaminate to have added dimension or feel. Thinner films do not appear as vivid or realistic as an 11 mil vinyl film featuring the simulated brushstroke pattern. The film products mentioned are also sold by D&K International, Inc., Elk Grove Village, Ill. Preferred adhesives are SUPERSTICK® or PSA (pressure sensitive adhesive) sold and used by D&K. The outer surface 21 of the first laminate 20 is embossed before it is used as an overlaminate. Specifically, the outer surface is given a random brushstroke pattern resulting in a textured or finished surface before it is wound on a supply roller or separated and stacked in discrete sheets.

Preferably, the embossing is provided on a 62" roller to minimize repetition in the pattern. The preferred pattern is shown in the joining of FIGS. 10A-10D at the lines A-A, B-B, C-C and D-D and has angularly related brush strokes. The pattern is preferably based on a customized painting or template designed specifically for this simulated brush stroke system. In creating the pattern, the artist purposefully utilized angularly related brush strokes in creating the painting/template in order to keep the pattern unique and without noticeable duplication. The original pattern was thereafter scanned by a reprographer and converted into a large digital file that showed the various brush strokes within the painting/template. This image was then digitally enhanced to improve or amplify the contrast of the strokes in the painting/template left by the artist's brush. The finished, resulting digital image of the brush stroke pattern was then used to create the embossing roller.

Additional patterns containing an underlying canvas texture under the brush strokes were also considered, but the resulting product displayed a crowded pattern interfering with the rich and simplified texture of a basic brush stroke.

To emboss the product, a stainless steel roller is created with a pattern etched therein. Stainless steel rollers are utilized for this purpose due to fact that they can be easily engraved and are the industry standard for roller embossing systems.

The film is passed over a heated roller or through a nip while under pressure to create the desired pattern. The etchings on the heated roller are opposite, or the negative, of the transferred pattern desired and resulting on the sheet of laminate 20. Once the overlaminates are embossed, they are slit to desired widths.

Having this large original or master roll width offers the end users many width options that can be customized to their desired print application. In addition to meeting different end user needs, this method of slitting down master roll widths also helps reduce material waste and costs typically encountered when laminating prints.

With respect to the second film 40, it has been found that a vinyl overlaminate works best. In particular, 8 mil or 8.2 mil vinyl having 2 mil of adhesive works the best. This product is also sold as SUPERSTICK® Linerless Heat Assist Canvas Overlaminate (Vinyl with UV Absorbers) by D&K International, Inc., Elk Grove Village, Ill. Other canvas products are also available from D&K International. The outer surface 41 of the second laminate 40 is embossed before it is used. Specifically, the outer surface is given a canvas-like pattern resulting in a textured or finished surface before it is wound on a supply roller or separated and stacked in discrete sheets. Once the overlaminates are embossed, they are slit to desired widths.

It must be recognized that the outer surface 21 of the first laminate 20 can also be embossed or treated to have a canvas-like pattern. Thus, while it is discussed to have a canvass-like appearance on the back laminate/substrate or side 40, the front laminate/substrate 20 can be treated the same so the picture (outer surfaces 101 of the substrate 100) has the appearance of being created on canvas.

Both the article or the substrate 100 to be laminated and the films 20,40 can take two forms: precut (discrete individual elements) and continuous. In the pre-cut approach, the substrates to be laminated and the films for lamination are precut, separated and stacked and then fed automatically or manually into the laminating machine. In short, the assembly 10 can be made by using discrete, or individual, pre-cut elements or segments of film and substrate by creating a sandwich with the substrate disposed between the films and feeding the combination into a laminating machine. Film pouches can be used for this process wherein the film 20,40 is adhered to one another along one or more marginal, peripheral edges and a thermal activated adhesive is applied on both surfaces of the pouch. The item to be laminated is inserted into the pouch and the combination is laminated by heat and pressure.

One can also use rolls of film and a roll of the print substrate and have the machine pull the three rolls, laminate the assembly, and slit/cut (e.g., die-cut) the resulting products as is well known in the industry. It is much more efficient and economical for the articles to be continuous, or in roll form, and fed into the lamination machine. Once laminated, the product is cut at its ends (the leading edge and the trailing edge) (transversely or cross-cut) and slit along its sides (the side margins) (longitudinally).

In continuous form, the film is supplied to the laminator from a supply roll and in web form. Usually, the web of film is fed to the laminating machine from a supply roll and the articles to be laminated are also supplied to the machine in web form from a supply roller. If the lamination is to be one-sided, the film is supplied from a single roll; if the lamination is to be two-sided, the film is supplied from two, separate rolls, one above the article to be laminated and one below the article to be laminated.

A double-sided laminating machine is preferred for creating such a product. It has been found that the Double Kote PVC Laminating Machine by D&K Custom Machine Design, Inc. of Elk Grove Village, Ill. is ideal for this. The machine is a thermal laminator designed specifically for laminating thicker substrates such as PVC and vinyl. The Double Kote PVC features dual chrome heated rollers for even pressure to apply over the films. It has simple controls and is easy to thread for effortless film changeovers. It can also produce anywhere from 300 to 2400 sheets per hour depending on the film thickness and substrate used. It can further laminate widths of 26" and can accept up to 44" in length. In addition, the Double Kote PVC lamination can laminate up to 30-mil substrate.

Figure 7:
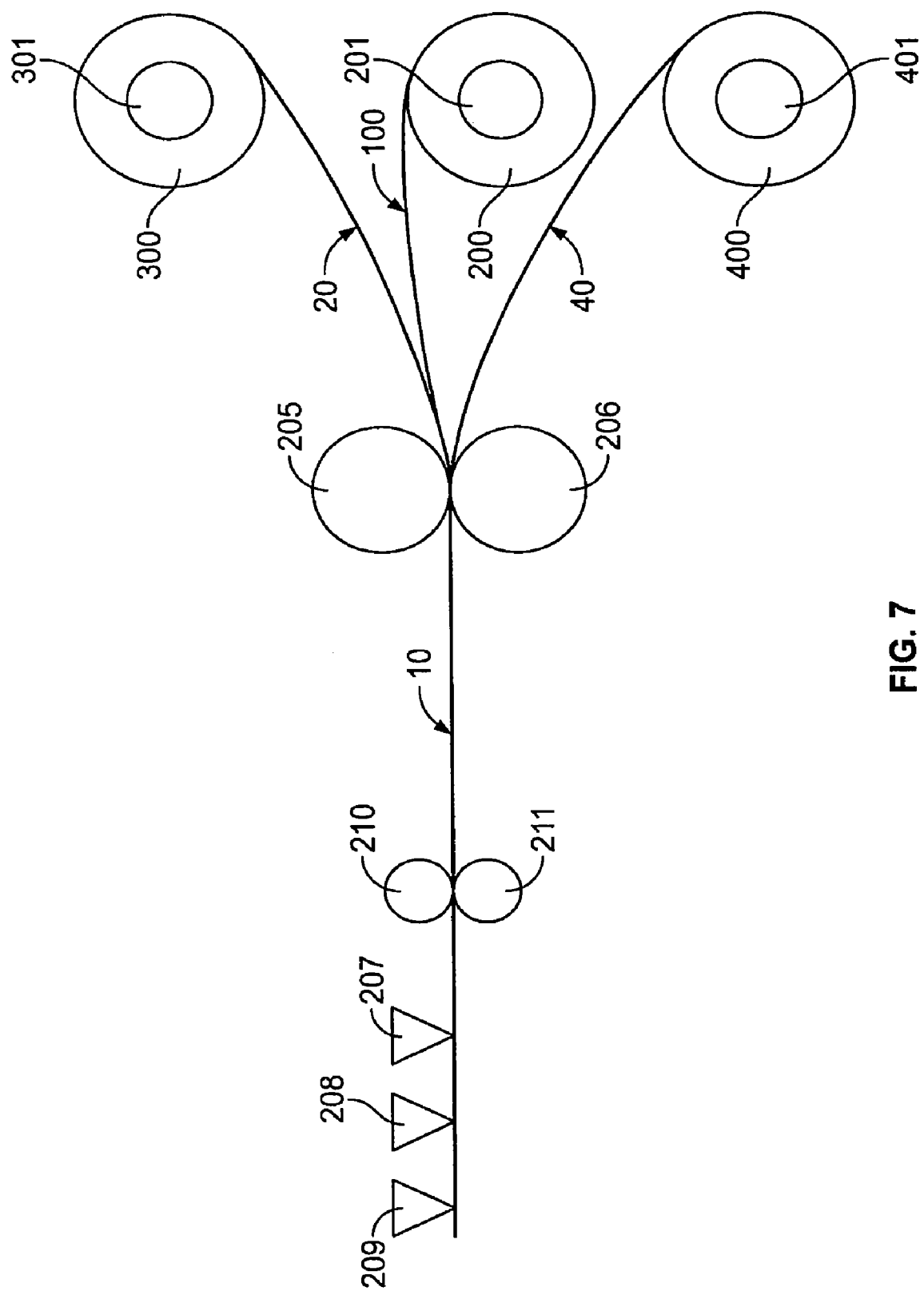
FIG. 7 is a schematic view of a laminating machine used to make the assembly of the present invention.

Referring to FIG. 7, the print substrate 100 (artwork, such as a poster or photo of a painting) is supplied by a first substrate supply roll 200 supported by first supply roller 201. The films 20,40 are supplied by first and second film supply rolls 300,400 supported by first and second supply rollers 301,401. The webs 200,300,400 are pulled (generally by pull rollers 210,211 through laminating rollers 205,206 forming a nip therebetween. Both laminating rollers 205,206 are heated and apply pressure therebetween. At the nip, pressure and heat are applied to the film and substrate passing therebetween. The heat applied is about 160°-200° F. The heat applied causes both the thermal adhesive layers 223,43 to melt. With the pressure simultaneously applied by the laminator rollers 205,206, the laminate 10 is formed.

Optional coolers, as is well known in the field, can be positioned downstream of the laminating rollers 205,206. In addition, longitudinal slitters 207 (cutting the laminated web in the direction of the movement (longitudinally)) and/or transverse cutters 208 (cutting the laminated web in the cross-direction of the movement (transversely) or die cutters 209 can be further incorporated into the system to cut the web of laminated material to the desired, final size.

Once cooled, the product is complete and finished.

While the films 20,40 and the adhesives 23,43 applied to each have been identified and described as being alike, they can, of course, be different. It is advantageous to use similar films and adhesives because the same thermal heating conditions will activate the adhesive layers simultaneously and the heated and cooled film will react, behave and wear consistently.

While unusual, one may chose to use different films and different adhesives depending on job requirements and cost requirements. In addition, the laminating films can have gloss or matte laminate finishes.

Figure 5:
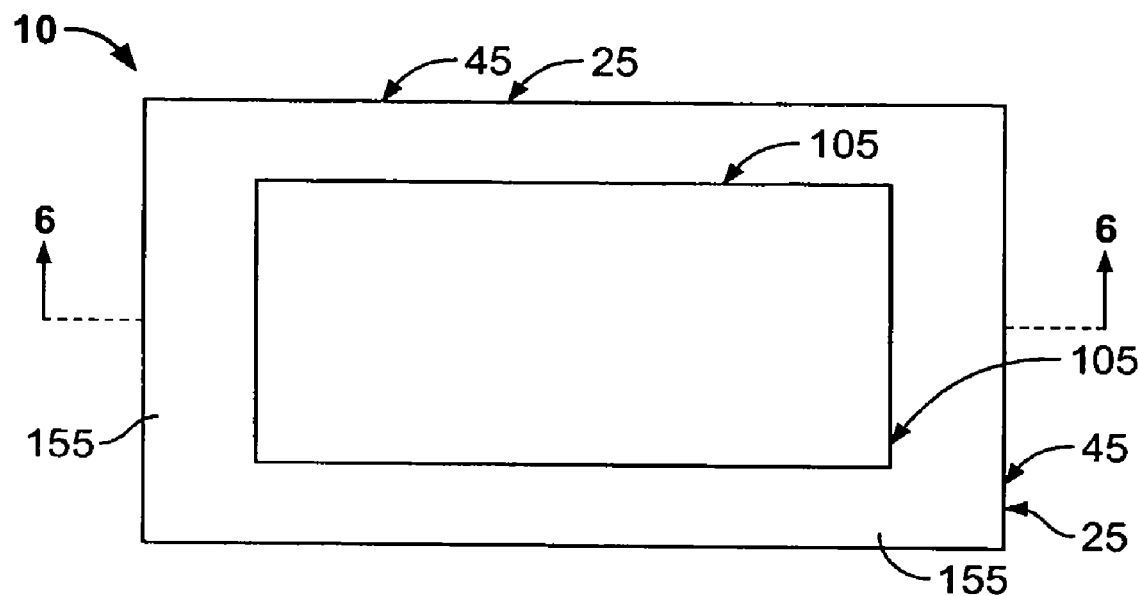
FIG. 5 is a top plan view of a second embodiment of the assembly of FIG. 1 as assembled.
Figure 6:
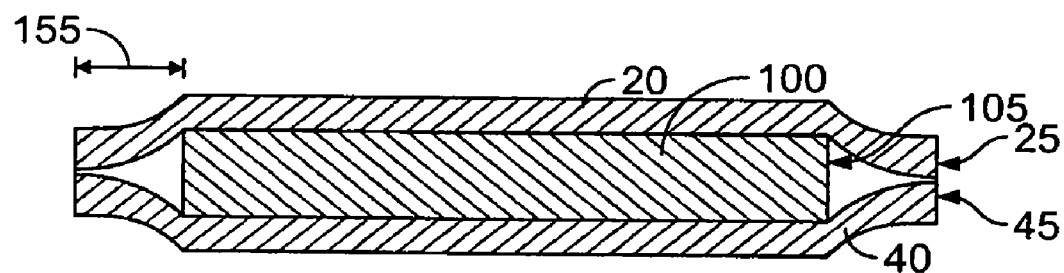
FIG. 6 is a cross-sectional view of the assembly along line 6-6 in FIG. 5.

As noted above, the laminate can be individual, such as with pre-cut films/substrates (or even pouches) or by a laminating machine and the use of supply rolls of substrates and film. As shown in FIGS. 3-6, the final laminate 10 can generally have aligned perimeter edges (FIGS. 3 and 4) or offset perimeter edges (FIGS. 5 and 6). When aligned, the outer perimeter edge 105 of the substrate 100 is aligned between the outer perimeter edges 25,45 of the films 20,40. This can be accomplished during the lamination process, or after the lamination process during cutting. For example, if the substrate film are supplied by rolls, they are laminated into sheets, each sheet having tens, if not hundreds of items thereon. The cutters, slitters or die-cutters of the lamination machine will separate the individual items from the sheet.

When offset, the outer perimeter edges 25,45 of the films extend outwardly beyond the outer perimeter edge 105 of the substrate 100 forming a marginal film edge 155 between the perimeter edges 25,45 of the films and the perimeter edge 105 of the substrate disposed therebetween. This is typically accomplished with a die-cutter.

Figure 8:
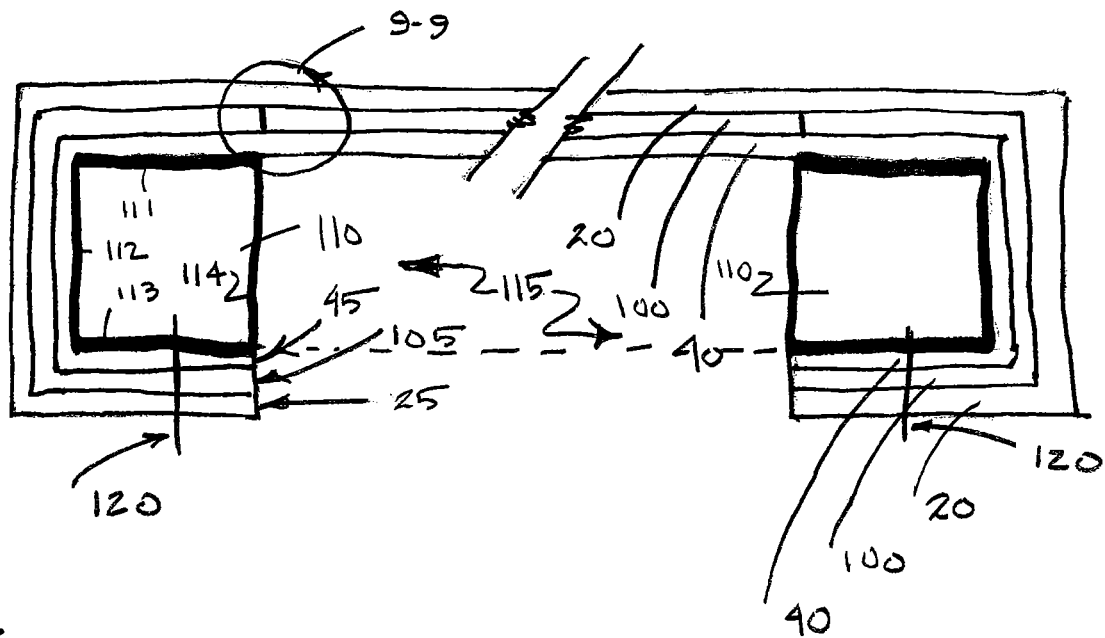
FIG. 8 is a cross-sectional view of the laminate attached to a frame member.
Figure 9:
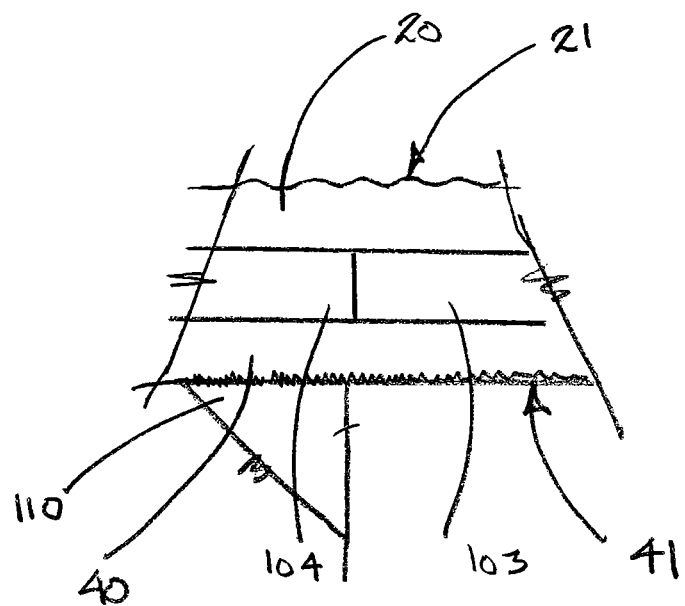
FIG. 9 is a close-up sectional view of the of the assembly within circle 9-9 in FIG. 8; and, FIGS. 10A-10D together (joined at intersections/lines A-A, B-B, C-C and D-D) are the embossed pattern on the embossing roller.
Figure 10A:
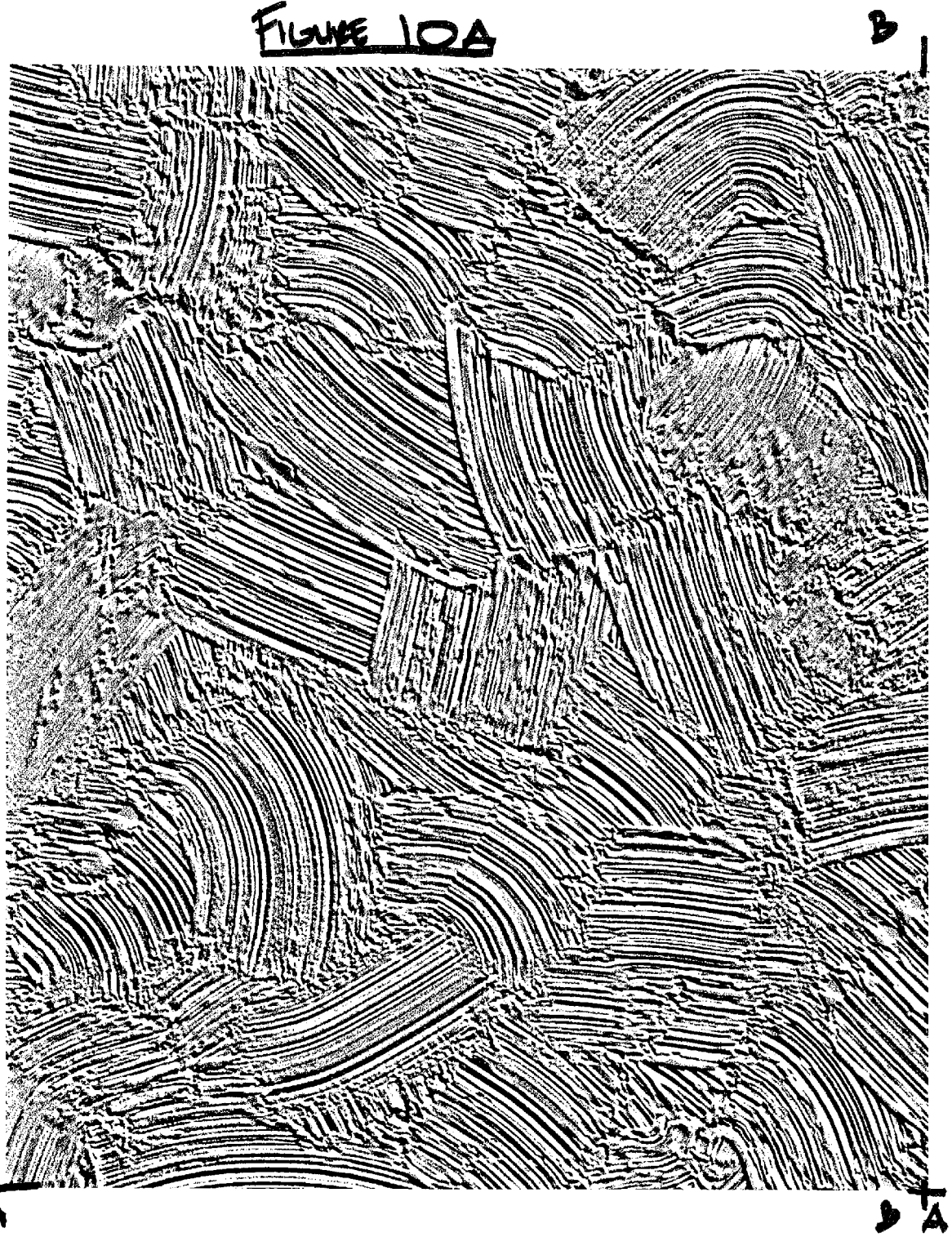
Figure 10B:
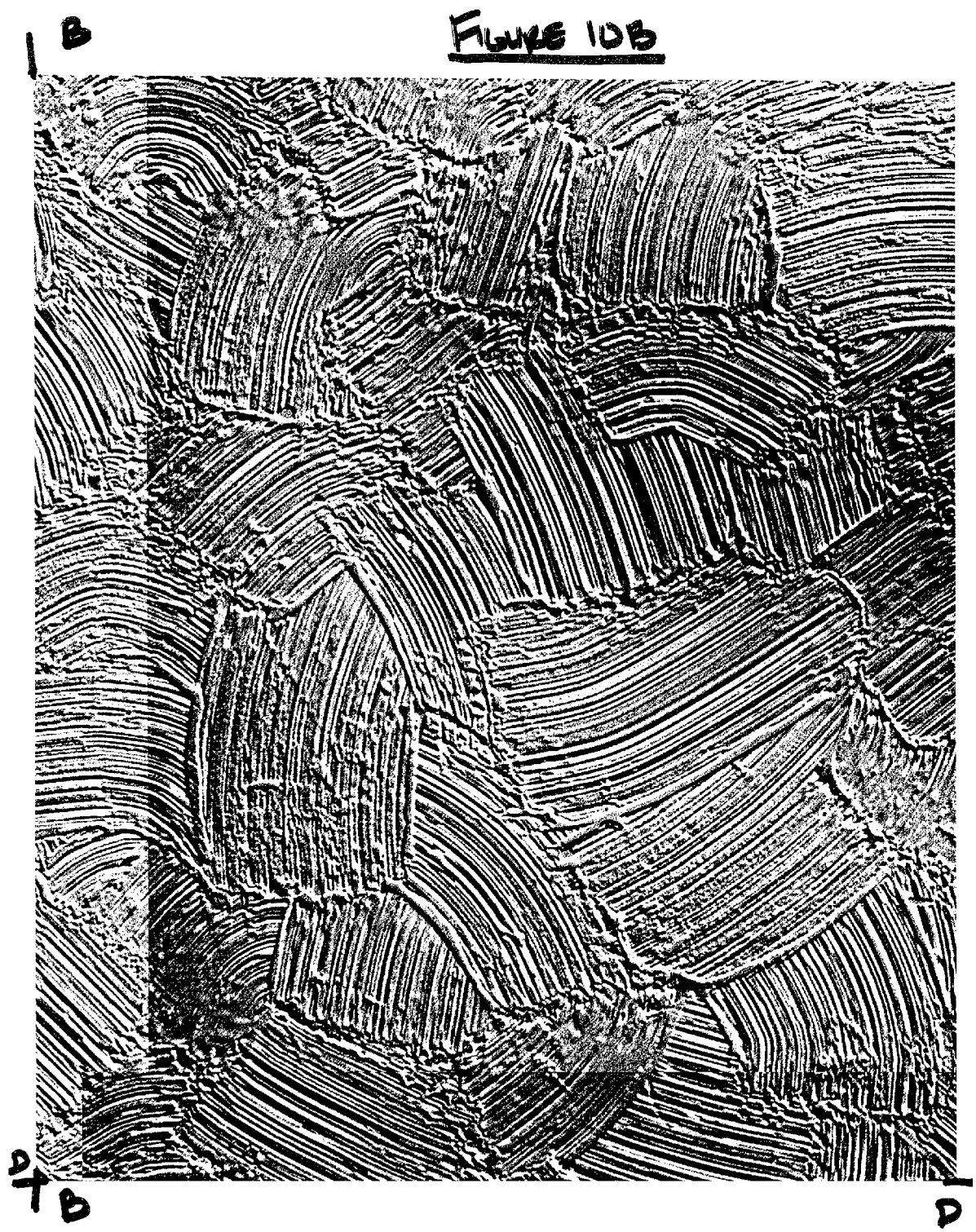
Figure 10C:
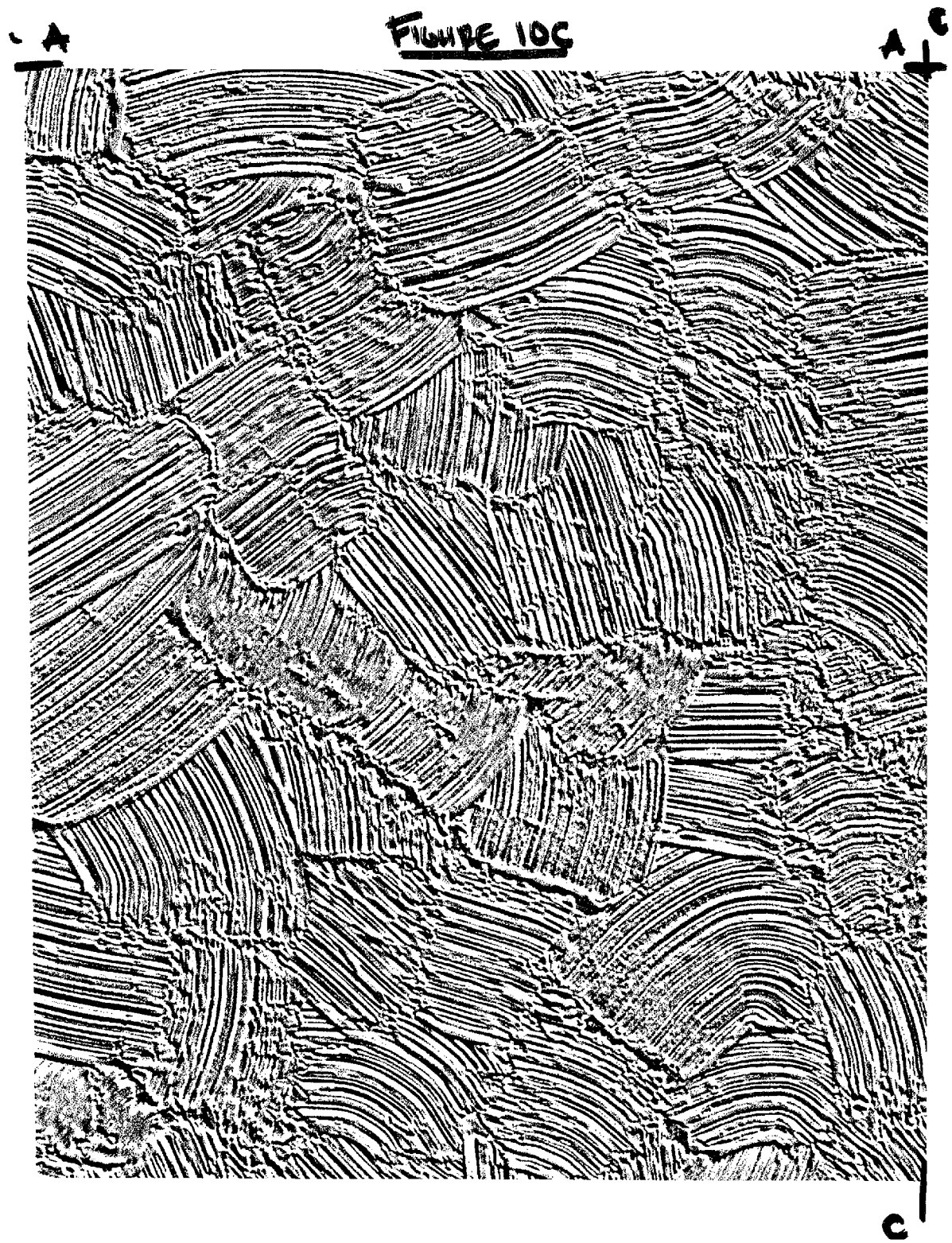
Figure 10D:

Turning to FIGS. 8 and 9, the completed laminate 20,100, 40 is stretched over a frame and secured thereto. In particular, the laminate, with the outer surface facing outwardly, away from the frame, is stretched over each of the frame elements 110. A typical rectangular frame has first opposed frame elements (ends) 110 and second opposed frame elements (sides) 110, with each frame element having a forwardly facing front surface 111, an outer side surface 112, a rearwardly facing back surface 113 and an inwardly facing side surface 114. An opening 115 is disposed between the opposed frame elements and each's inwardly facing side surface 114.

Thus, the laminate 10 is stretched over each frame element 110 and secured to the back surface 113 of the frame elements by standard and conventional heavy duty staples 120 placed longitudinally along the frame and inside the perimeter 25,105,45 of the laminate. Note the staples must pierce through the laminate 10 and a portion of the frame 110. Depending on preferences, the image 103 on the substrate 100 can be wrapped around the frame and secured. Or, in the alternative, the image 103 on the substrate 100 can be limited to cover only the opening 115 in the frame 110 and the marginal edges 104 of the substrate can be wrapped around frame elements 110 and secured to the back surface 113 of the frame 110. See FIG. 9.

The secured laminate 10,110 can be presented or exhibited after this point. The outer brush stroked surface 21 will face outwardly in the front and the outer canvas textured surface 41 will face outwardly in the rear. If desired, a separate frame (not shown) can be further placed around the secured laminate 10,110 so as to frame the entire picture.

The terms "first," "second," "upper," "lower," "front," "back," etc. are used for illustrative purposes only and are not intended to limit the embodiments in any way. The term "plurality" as used herein is intended to indicate any number greater than one, either disjunctively or conjunctively as necessary, up to an infinite number. The terms "joined" and "connected" as used herein are intended to put or bring two elements together so as to form a unit, and any number of elements, devices, fasteners, etc. may be provided between the joined or connected elements unless otherwise specified by the use of the term "directly" and supported by the drawings.

While the specific embodiments have been illustrated and described, numerous modifications come to mind without significantly departing from the spirit of the invention, and the scope of protection is only limited by the scope of the accompanying claims.

What is claimed is:

1. A method for creating a laminated structure comprising the steps of:
   a) positioning an image-carrying substrate having first and second opposed outer surfaces between
      1) a first film having an outer surface with a plurality of angularly-related brush stroke textures embossed therein before it is used and an inner surface with a first adhesive thereon and overlaying the first outer surface of the substrate and, 2) a second film having an outer surface with a canvas texture embossed therein before it is used and an inner surface with a second adhesive thereon and overlaying the second outer surface of the substrate; and, b) laminating the image-carrying substrate disposed between the first and second films.

2. The method of claim 1, wherein the substrate has an outer perimeter edge and the step of positioning the substrate includes aligning outer perimeter edges of the first and second films so that such perimeter edges are either aligned with the outer perimeter edge of the substrate or extend outwardly beyond the outer perimeter edge of the substrate and align with the perimeter edges of one another so as to form a marginal edge between the perimeter edges of the films and the perimeter edge of the substrate disposed therebetween.

3. The method of claim 1, wherein the first and second films are vinyl and the adhesive for the first and second films is thermally activated and the step of laminating is performed by a thermal laminating machine.

4. The method of claim 1 wherein each of the plurality of angularly-related brush stroke textures includes a random brushstroke pattern to form a unique pattern without noticeable duplication.

5. A method of using a film to create a laminated structure comprising the steps of:

a) supplying a first laminating film having an outer surface with a plurality of angularly-related brush stroke textures embossed therein before it is used and an inner surface with a first adhesive thereon;

b) supplying a second laminating film having an outer surface with a canvas texture embossed therein before it is used and an inner surface with a second adhesive on the inner surface;

c) positioning an image-carrying substrate having first and second opposed outer surfaces between the first and second laminating films such that the outer surfaces of the substrate face the inner surfaces of the films; and d) laminating the structure together.

6. The method of claim 5, wherein
the first and second laminating films are vinyl and
the first and second adhesives are thermally activated.

7. The method of claim 5 wherein each of the plurality of angularly-related brush stroke textures includes a random brushstroke pattern to form a unique pattern without noticeable duplication.

8. A method for creating a laminated structure comprising the steps of:

a) positioning a substrate having first and second opposed outer surfaces between 1) a first film having an outer surface supplied with a plurality of angularly-related brush stroke textures embossed therein before it is used and an inner surface with a first adhesive thereon and overlaying the first outer surface of the substrate and, 2) a second film having an outer surface supplied with a canvas texture embossed therein before it is used and an inner surface with a second adhesive thereon and overlaying the second outer surface of the substrate; and, b) laminating the substrate disposed between the first and second films.

9. The method of claim 8, wherein the substrate has an outer perimeter edge and the step of positioning the substrate includes aligning outer perimeter edges of the first and second films so that such perimeter edges are either aligned with the outer perimeter edge of the substrate or extend outwardly beyond the outer perimeter edge of the substrate and align with the perimeter edges of one another so as to form a marginal edge between the perimeter edges of the films and the perimeter edge of the substrate disposed therebetween.

10. The method of claim 8, wherein the first and second films are vinyl and the adhesive for the first and second films is thermally activated and the step of laminating is performed by a thermal laminating machine.

11. The method of claim 8, wherein the first film has a thickness no less than 11 mils.

12. The method of claim 8 wherein each of the plurality of angularly-related brush stroke textures includes a random brushstroke pattern to form a unique pattern without noticeable duplication.

\* \* \* \* \*